March 30, 1937. J. W. ALLEN 2,075,078
DRIVING MECHANISM
Original Filed Jan. 28, 1932
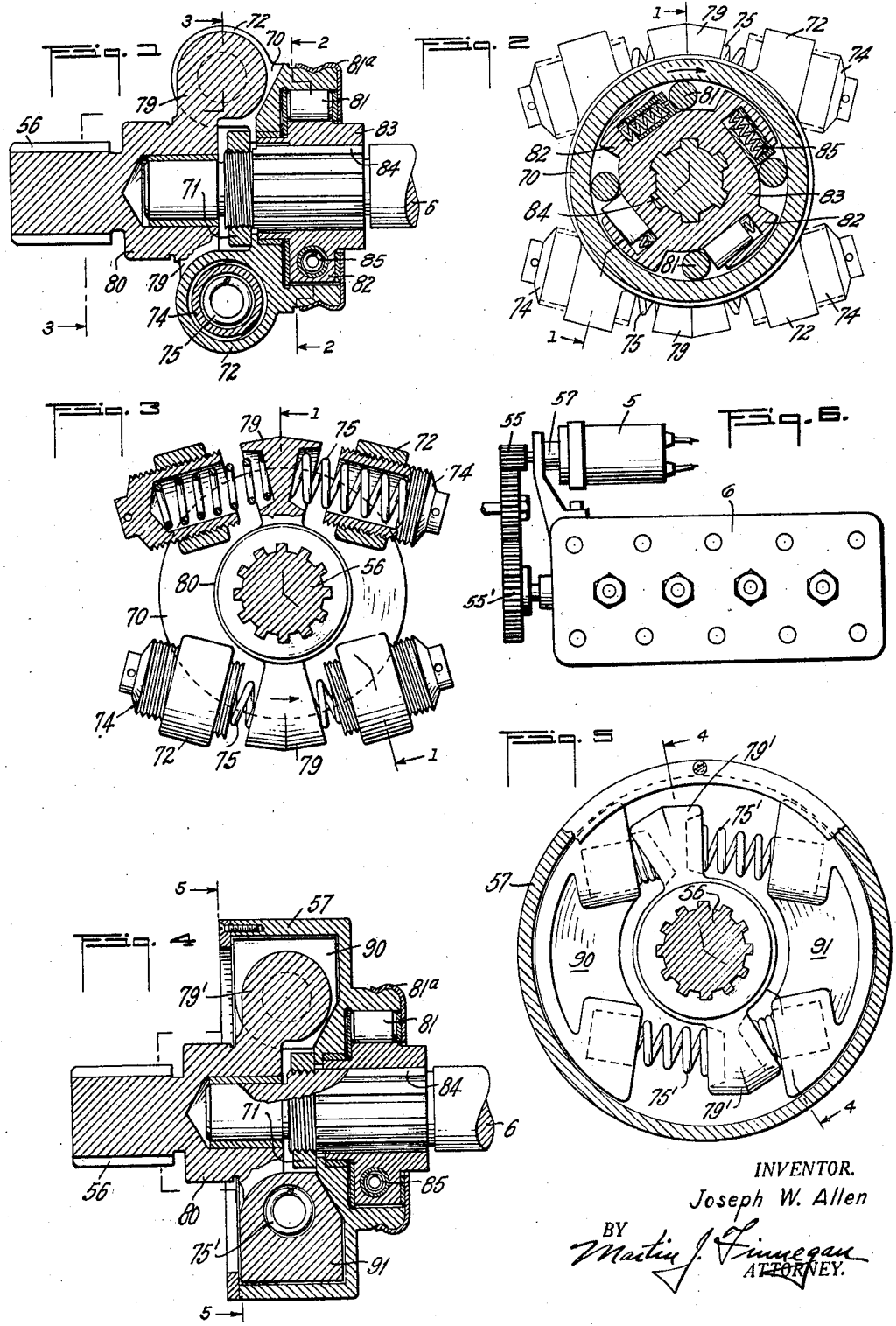
INVENTOR.
Joseph W. Allen
BY Martin J. Finnegan
ATTORNEY.

Patented Mar. 30, 1937

2,075,078

UNITED STATES PATENT OFFICE 2,075,078

DRIVING MECHANISM

Joseph W. Allen, East Orange, N. J., assignor, by mesne assignments, to Eclipse Aviation Corporation, East Orange, N. J., a corporation of New Jersey Original application January 28, 1932, Serial No. 589,516. Divided and this application January 26, 1933, Serial No. 653,747

7 Claims. (Cl. 192—48)

This invention relates to driving mechanism, and particularly to driving mechanism of the type adapted to transmit torque in one direction only and permitting relative rotation between the driving and driven members.

Although not limited to such use, the present invention has for one of its objects an improvement in driving means heretofore employed for drivably connecting an internal combustion engine and a generator of electrical energy for use in radio equipment and other electricity consuming devices on a vehicle such as an airplane in which said internal combustion engine is installed.

Generators of this character have been used heretofore on vehicles equipped with radio transmitting apparatus, particularly aircraft; and when so employed, in addition to the mechanical driving means, such generators have in certain instances been equipped with electrical connections to a battery or equivalent source of electrical energy whereby the generator may be operated as a motor generator or dynamotor so as to continue supplying current to a radio transmitter or other load, notwithstanding a de-energization or disabling of the aircraft engine. When so operated the device has been provided with overrunning clutch mechanism, permitting relative rotation between the armature shaft and the engine driven member when the engine is at rest, while at the same time affording a positive drive while the engine is running. When such an overrunning clutch constitutes the sole driving connection between the engine and the generator, the latter is subjected to the shocks and speed fluctuations characteristic of an internal combustion engine, which shocks and fluctuations are obviously objectionable, particularly when the load being supplied by the generator is one which requires the maintenance of constant voltage output from the generator.

Accordingly one of the objects of the present invention is to provide improved operating connections between driving and driven elements, such as an engine and an electrical unit driven thereby, said novel connections embodying features, the use of which serve to eliminate the disadvantages above referred to. By way of illustration of this phase of the invention, two embodiments are herein shown, one of which involves the use of a combined flexible coupling, speed responsive clutch and one-way clutch in a single unit adapted to produce both overrunning and yielding actions, and the second also providing flexible and overrunning features.

Another object of the invention is to provide a flexible coupling employing one or more pairs of shock absorbing springs or equivalent resilient elements characterized by the fact that one resilient element of each pair acts to cushion sudden accelerative impulses of the driving element, while the other of each pair acts to eliminate, or at least minimize, the objectionable backlash which is characteristic of many flexible couplings heretofore used.

These and other objects and advantages to be derived from the use of the invention disclosed herein will become evident on a consideration of the following description when read with reference to the accompanying drawing illustrating two embodiments of the invention. It is to be expressly understood however, that said drawing is for the purpose of illustration only, and is not to be construed as a definition of the limits of the invention, reference being had for this purpose to the appended claims.

In the drawing,

Fig. 1 is a view in longitudinal section of a device embodying the invention;

Fig. 2 is a transverse sectional view along the line 2—2 of Fig. 1;

Fig. 3 is a transverse section taken along the line 3—3 of Fig. 1;

Figs. 4 and 5 are sectional views of a second novel coupling;

Fig. 6 is a plan view of an internal combustion engine power plant with one embodiment of the present invention applied thereto.

Referring to Figs. 1, 2, 3 and 6 the invention is therein shown as embodying a device having a central hub portion 70 that is mounted on the armature shaft of a generator 5 constituting part of the internal combustion power plant indicated at 6 in Fig. 6, and is adapted to rotate with said armature shaft, being suitably retained thereon as by means of a threaded nut 71. In the form shown, the hub 70 has eyes 72 which extend substantially at right angles to the plane of the central portion 70, the inner walls of the openings in each eye being threaded to receive exteriorly threaded cup-shaped members or holders 74. Preferably the outer end of each holder is slotted to receive a suitable adjusting tool.

Extending into each of the cups is one end of a compression coil spring 75 of any suitable type. The opposite ends of springs 75 engage opposite faces of an intermediate coupling member 79 which is integral with the bored coupling member 80, the latter having a splined portion 56 adapted to receive a gear 55 driven from the crankshaft of the engine 6 through connecting gearing indicated at 55' in Fig. 6. As shown in Fig. 3, the faces of the coupling member 79 are cut at an angle to the center line thereof so as to be normal to the axes of the springs engaging therewith, the latter being disposed along lines approximately tangential to the central hub portion 70.

The overrunning portion of the coupling includes a plurality of rollers 81 adapted to be held by a resilient cap 81a between a corresponding number of radially extending portions 82 formed at regularly spaced intervals about the periphery of an inner race 83 splined to the armature shaft 6 as indicated at 84. As shown best in Fig. 2, these rollers are normally maintained in engagement with the inner surface of the hub 70 by resilient means, such as springs 85, so that, as member 70 rotates in a clockwise direction, rollers 81 will be effective to rotate the driven member 83. However, if it is attempted to transmit torque from member 83 to member 70 in the same direction of rotation, the rollers 81 will become ineffective.

From the foregoing it is apparent that as driving torque is transmitted from the engine to the coupling member 80, one spring of each of the pairs acts yieldingly to transmit the driving force to the armature shaft 6, and at the same time to cushion the shocks due to changes in the engine speed, while the other spring 75 of each pair serves to cushion the subsequent rebound action of the coupling member 79 and thus eliminate, or at least substantially minimize, the backlash which would otherwise result. The compression of springs 75 is positively limited by the engagement of the adjacent ends of holders 74 and 79, prior to total deflection of the springs, and by suitably adjusting said holders the load deflection characteristics of the connection may be varied within wide limits. Moreover the inertia of the armature is yieldable overcome by the flexible coupling without sudden jars or shocks.

The construction is particularly adapted for use in connection with airplane engines wherein no flywheel is provided, and wherein the engine vibration and sudden starting and stopping of the engine is likely to seriously damage or disrupt the driving connection between the generator and the engine, if said connection is non-yielding.

Figs. 4 and 5 show a second form of driving connection which may be employed, this form embodying the flexible and overrunning features of the coupling shown in Figs. 1, 2 and 3, but adding thereto a centrifugal factor, obtained by substituting for the holders 74 of Figs. 1, 2 and 3, a pair of friction shoes 90 and 91 adapted to be maintained in firm frictional contact with the inner surface of a drum 57 by the action of springs 75', one pair of which are adapted to absorb shocks transmitted in one direction by yielding in the manner indicated in Fig. 5, and the other being adapted to absorb shocks transmitted in the opposite direction. It will be noted however, that all four springs, as well as centrifugal force, act to maintain the shoes in frictional contact, and the torque transmitting capacity of the clutch will accordingly depend in part upon the size and setting of the said springs. Preferably the central driving member 79' is driven from the engine or other mechanical driving means while the drum 57 constitutes the outer race of an overrunning clutch assembly preferably taking the form of that shown in Figs. 1 and 2, the provision of such an overrunning clutch mechanism being operative to prevent any frictional wear between the shoes 90 and 91 on the one hand, and the drum 57 on the other, during the time the electrical unit is being operated from the battery as a motor generator.

With this construction it is apparent that as the engine approaches its normal speed the centrifugal force acting upon the shoes 90 and 91 will cause them to establish firm contact with the inner surface of the drum 57 while at the same time permitting a slipping of the shoes along said surface in the event of excessive shocks being imparted to said shoes through the engine driven connections. As soon as the shoes have absorbed the shock thus imparted, the shoes again resume positive frictional association with the drum and thus maintain the latter at a constant speed of rotation without presenting thereto the excessive shocks and vibrations of the engine. The roller clutch acts to break the driving relationship and thus prevent a return torque transmission to the engine driven members from the generator, when the latter is operated as a dynamotor.

Having thus described several of the important embodiments of the present invention, it is to be understood that various other constructions may be employed without departing from the spirit of the invention, so long as the variations are within the scope of the appended claims. Reference will therefore be had to these claims for a definition of the limits of the invention.

This is a division of my Patent No. 1,921,719 granted August 8, 1933, filed January 28, 1932.

What is claimed is:

1. In a driving mechanism for use with an internal combustion engine and an auxiliary engine unit, the latter being adapted to be energized by said engine and by means independent of said engine at different periods, the combination with said engine, of a driving member positively connected with the engine, and rectilinearly movable speed responsive means for frictionally connecting said driving member with said auxiliary engine unit, said speed responsive means including resilient means also serving to cushion the drive from said driving member to said auxiliary engine unit, said resilient means also serving to maintain a certain degree of frictional pressure upon said auxiliary engine unit regardless of speed.

2. In combination, in a device of the class described, a driving member, a driven member, a friction clutch connecting said members including a plurality of friction shoes subject to centrifugal force, a plurality of springs also tending to hold said shoes in driving relation to the driven member, said springs being yieldable to provide flexibility in the drive, a drum adapted to be engaged by said friction shoes, and an overrunning clutch whose outer race is integrated with said drum and whose inner race is integrated with said driven member.

3. A clutch for driving and driven shafts comprising a driving member carried on the driving shaft and having a pair of oppositely extending aligned arms, a speed responsive member adjacent said driving member and having a plurality of recesses therein, resilient means mounted in said recesses for transmitting torque from one to the other of said members, said members being adapted to directly engage for transmission of driving torque independently of said resilient means upon application of a predetermined torque, and said resilient means being received in said recesses and compressed less than the full amount of which they are capable during direct engagement of said members.

4. A clutch for driving and driven shafts comprising a driving member carried on the driving shaft and having a pair of oppositely extending diametrically aligned arms, a slidably mounted member adjacent said driving member and having a plurality of recesses therein, resilient means mounted in said recesses for transmitting torque from one to the other of said members, said members being adapted to directly engage for transmission of driving torque independently of said resilient means upon application of a predetermined torque, and said resilient means being received in said recesses and compressed less than the full amount of which they are capable during direct engagement of said members.

5. In a driving mechanism for use with an internal combustion engine and an auxiliary engine unit, the latter being adapted to be energized by said engine and by means independent of said engine at different periods, the combination with said engine of a one-way driving connection interposed between said engine and unit, said one-way driving connection including an inner race positively connected with said unit, an outer race coaxial therewith, a driving member positively connected with the engine, and yieldable shock absorbing means acting along parallel lines tangential to a common circle having its center in the axis of rotation of said one-way driving connection.

6. In a power drive, a splined shaft, an overrunning clutch hub splined to the shaft, an overrunning clutch housing, uni-directional clutch elements disposed between the housing and hub, a driven clutch plate, a driving clutch plate to impart rotary movement to the driven clutch plate, and a plurality of springs acting along parallel lines tangential to a common circle having its center in the axis of rotation of said plates to form a resilient connection between said plates.

7. In a device of the class described, a driving member, a driven member, a friction clutch connecting said members including a plurality of friction shoes and a drum engaged by said shoes, resilient means for transmitting the drive from said driving member to said friction shoes and an overrunning clutch having an outer race integrated with said drum and an inner race integrated with said driven member.

JOSEPH W. ALLEN.